(12) United States Patent
Rai et al.

(10) Patent No.: US 9,806,856 B1
(45) Date of Patent: Oct. 31, 2017

(54) EFFICIENTLY RESPONDING TO MOBILE-DEVICE REQUESTS IN A WIRELESS ENVIRONMENT

(71) Applicant: Sprint Communications Company L.P., Overland Park, KS (US)

(72) Inventors: Deveshkumar Narendrapratap Rai, Overland Park, KS (US); Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 191 days.

(21) Appl. No.: 14/815,445

(22) Filed: Jul. 31, 2015

Related U.S. Application Data

(63) Continuation of application No. 12/644,774, filed on Dec. 22, 2009, now Pat. No. 9,125,132.

(51) Int. Cl.
*H04W 4/00* (2009.01)
*H04L 1/16* (2006.01)
*H04W 28/06* (2009.01)
*H04W 68/02* (2009.01)

(52) U.S. Cl.
CPC ........... *H04L 1/1685* (2013.01); *H04W 28/06* (2013.01); *H04W 68/02* (2013.01)

(58) Field of Classification Search
CPC ...................................... H04W 68/02
USPC ....................................... 370/339
See application file for complete search history.

(56) References Cited

U.S. PATENT DOCUMENTS

2016/0029386 A1* 1/2016 Sekiya ............... H04L 47/50
370/329

* cited by examiner

*Primary Examiner* — Dang Ton

(57) ABSTRACT

Multiple mobile devices can request or wait for acknowledgement from a device associated with a mobile telecommunications network. Embodiments of the present invention include creating and broadcasting a single acknowledgment to multiple mobile devices. Mobile devices can be associated with identifiers that include sets of characters. In order to acknowledge more than one device with one broadcast, subsets of characters from more than one identifier can be included in one value. One acknowledgement is broadcast to multiple devices. The devices are able to identify the unique subsets of characters and compare them to portions of identifiers. Multiple devices can recognize acknowledgement based on a shared value that is broadcast to the devices.

15 Claims, 13 Drawing Sheets

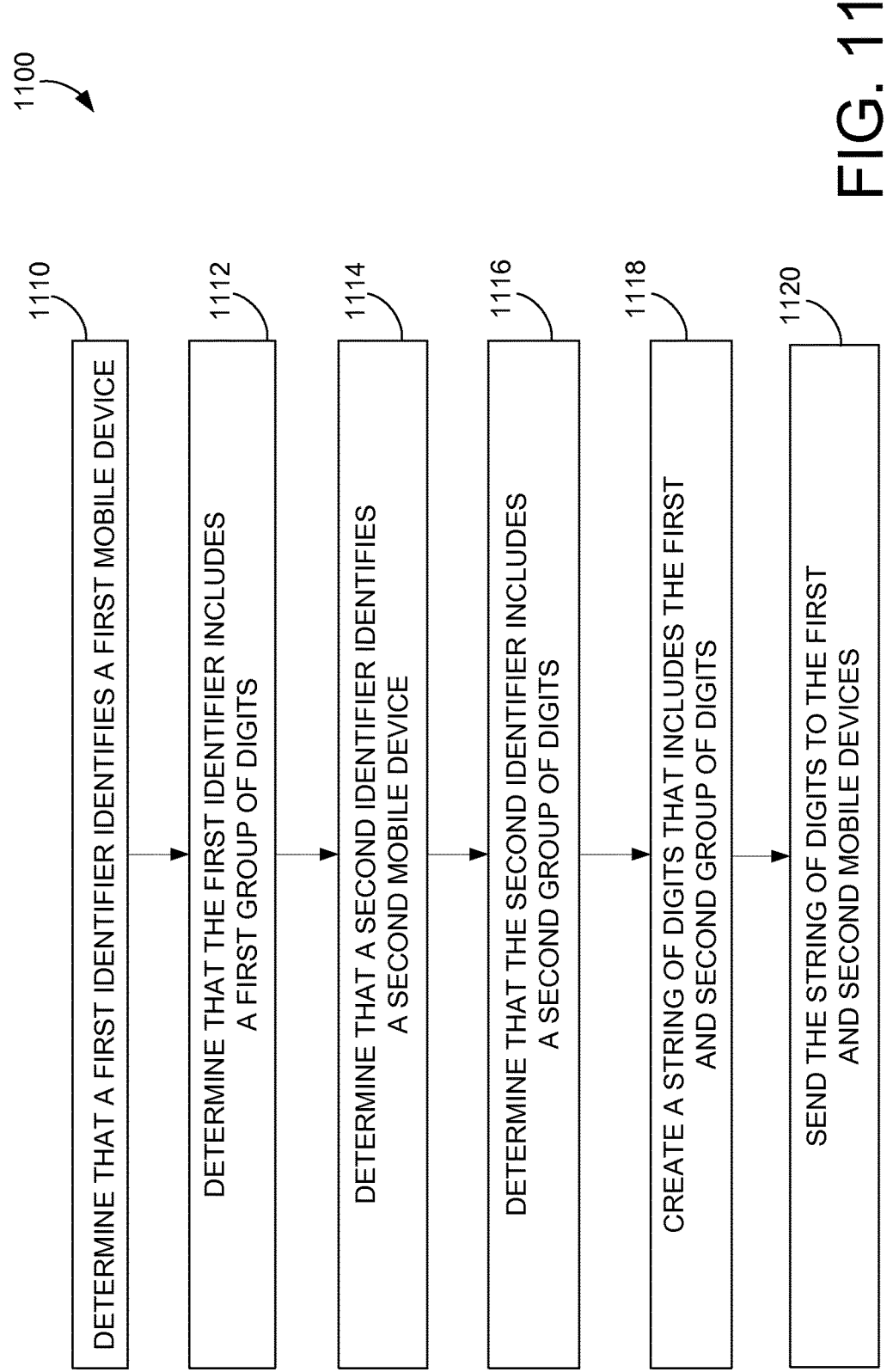

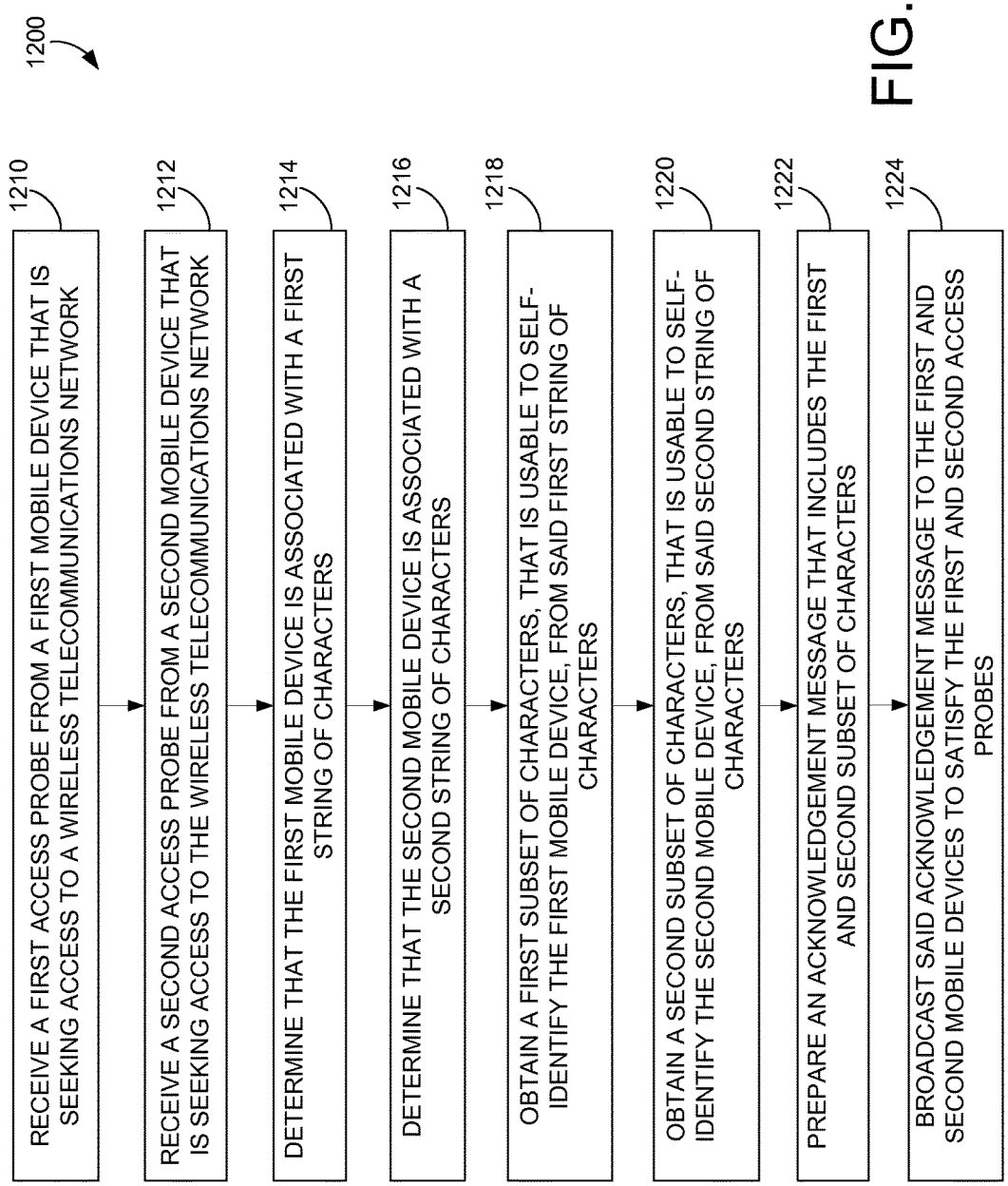

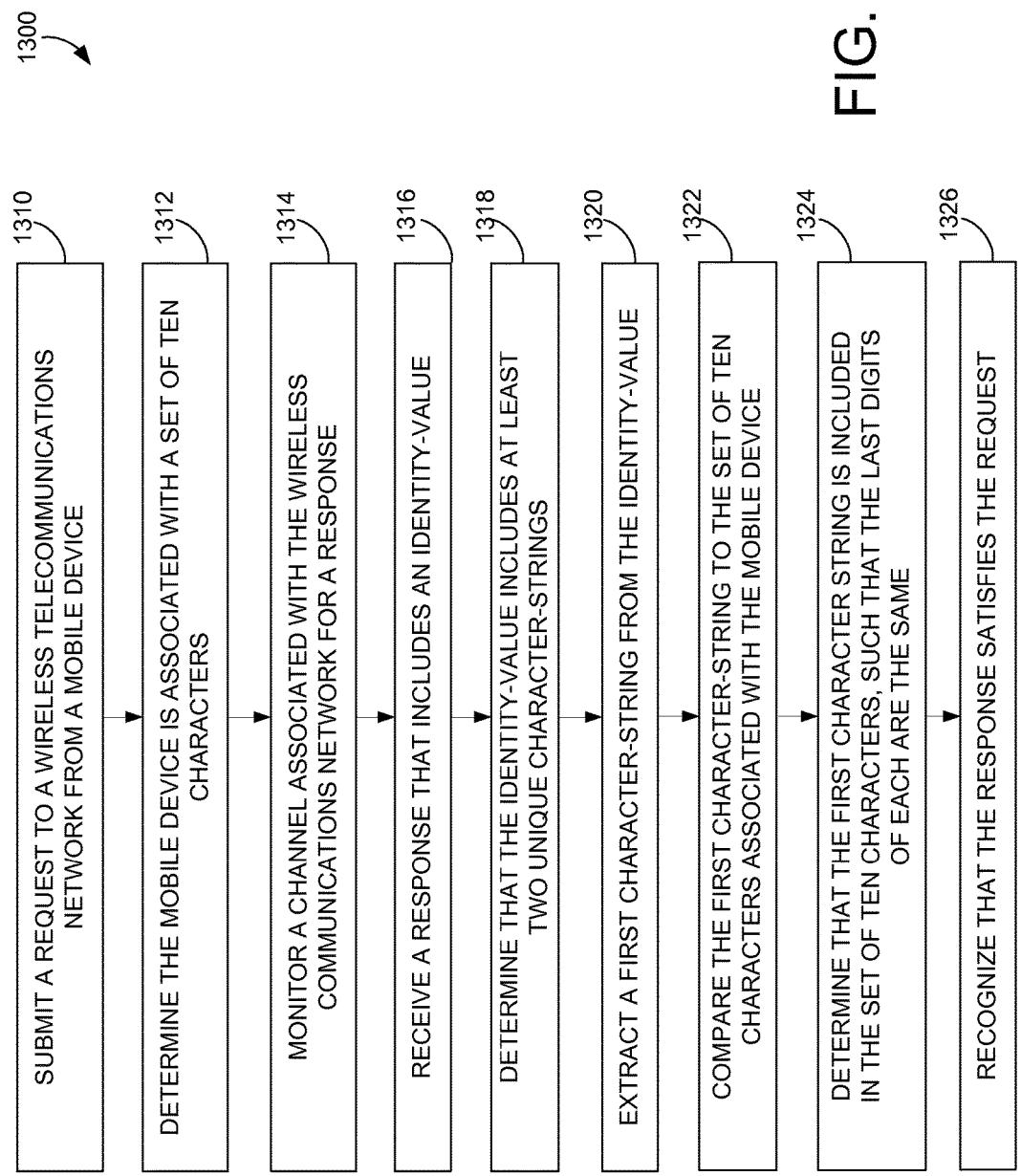

EFFICIENTLY RESPONDING TO MOBILE-DEVICE REQUESTS IN A WIRELESS ENVIRONMENT

CROSS-REFERENCE TO RELATED APPLICATIONS

This application is a continuation of U.S. application Ser. No. 12/644,774, filed Dec. 22, 2009, entitled "Efficiently Responding To Mobile-Device Requests In A Wireless Environment," which is incorporated herein by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first embodiment, computer-executable instructions cause a computing device to perform a method of using a single acknowledgement message to acknowledge requests from multiple mobile devices. The embodiment includes determining that a first identifier, which includes a first group of digits, identifies a first mobile device. The method includes determining that a second identifier, which includes a second group of digits, identifies a second mobile device. A string of digits is created. The string includes the first group of digits from the first identifier and the second group of digits from the second identifier. The string is broadcast to the mobile devices and can be used to satisfy an acknowledgement requests from both the first mobile device and the second mobile device.

In another embodiment, a method of simultaneously acknowledging more than one mobile device includes receiving a first access probe from a first mobile device, and receiving a second access probe from a second mobile device, where the first and second mobile devices are seeking access to a wireless telecommunications network. The method includes determining that the first mobile device is associated with a first string of characters and that the second mobile device is associated with a second string of characters. A first subset of characters is obtained from the first string of characters, and a second subset of characters is obtained from the second string of characters. The first subset of characters is capable of self-identifying the first mobile device, and the second subset of characters is capable of self-identifying the second mobile device. One acknowledgement message, including the first and second subset of characters, is prepared and broadcast to both mobile devices.

In yet another embodiment, a mobile device submits a request to a mobile telecommunications network. It is determined that the mobile device is associated with a set of at least ten characters. The mobile device receives a response that includes an identity-value. It is determined that the identity-value includes at least two unique character strings and that the response is capable of satisfying more than one request from more than one mobile device. One character-string is extracted from the identity-value in the response, and the character-string is compared to the set of ten characters associated with the mobile device. It is determined that the character-string is included in the set of ten characters, such that the last character of the character-string is the same as the last character of the set of ten characters. The mobile device can recognize that the response satisfies the request, based on the determination that the first character-string is included in the set of ten characters.

BRIEF DESCRIPTION OF THE SEVERAL VIEWS OF THE DRAWINGS

Illustrative embodiments of the present invention are described in detail below with reference to the attached drawing figures, and wherein:

FIG. 11 is a flow diagram illustrating an exemplary method in accordance with embodiments of the present invention;

FIG. 12 is a flow diagram illustrating an exemplary method in accordance with embodiments of the present invention; and FIG. 13 is a flow diagram illustrating an exemplary method in accordance with embodiments of the present invention.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps disclosed herein unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| IMSI | International Mobile Subscriber Identity |
| RAN | Radio Access Network |
| RF | Radio Frequency |
| TMSI | Temporary Mobile Subscriber Identity |

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-executable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
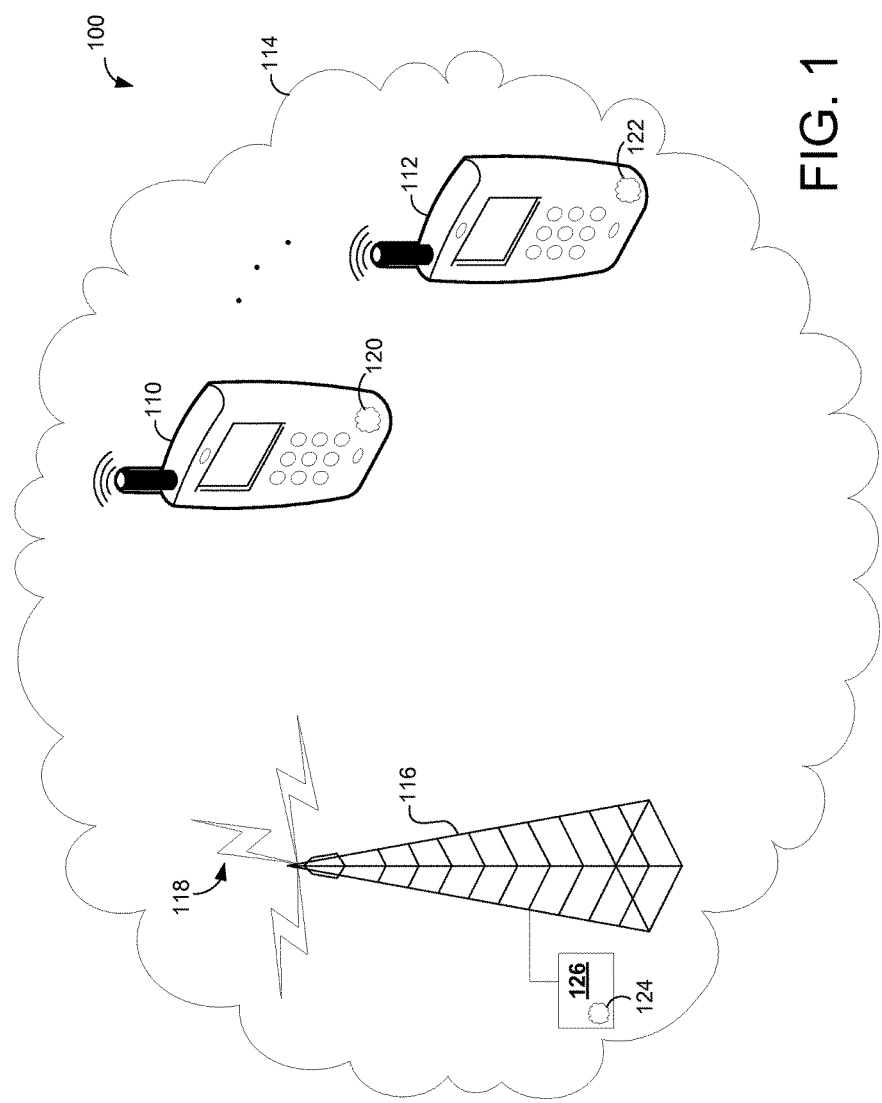
FIG. 1 is an illustrative operating environment suitable for practicing an embodiment of the present invention.

Embodiments of the present invention include one or more mobile devices ("devices"), such as the mobile devices 110 and 112 shown in FIG. 1. Mobile devices in accordance with the present invention may be any devices capable of communicating over a mobile telecommunications network ("network"). Although mobile devices, such as cellular phones and personal data devices, are discussed with respect to exemplary embodiments below, it should be appreciated that mobile computing devices that can access a network, or receive acknowledgement using a downlink channel associated with a network, are capable of operation in accordance with embodiments of the present invention.

At any given point in time, more than one mobile device can be awaiting an acknowledgement associated with a network. As opposed to broadcasting a unique acknowledgement to each device, embodiments of the present invention include methods of reducing the amount of communication necessary to acknowledge multiple devices. For example, simultaneously broadcasting one acknowledgment to two devices could reduce traffic on a channel associated with a network. Using one acknowledgement for even more than two devices may further reduce traffic to the devices. Because the devices may receive acknowledgement faster, the devices may submit fewer requests for acknowledgement, thereby reducing traffic on another channel associated with the network. The amount of devices that share one acknowledgement may vary depending on the demands on the network.

FIG. 1 illustrates an exemplary operating environment suitable for practicing an embodiment of the invention, designated generally by the numeral 100. Mobile devices 110 and 112 are within a coverage area of a mobile telecommunications network, such as network 114. In one example, the network 114 is a radio access network (RAN). The coverage area of a network 114 can be an area capable of receiving broadcasts from one or more base stations, such as base station 116. In the example in FIG. 1, base station 116 includes radio frequency (RF) signal 118. RF signal 118 can include one or more channels, or links, discussed below, for communicating with devices that are within the coverage area of network 114.

Although two devices are shown in FIG. 1, any number of mobile devices can be within reach of broadcasts from base station 116. The coverage area of network 114 may or may not encompass base station 116, and coverage areas associated with one or more base stations may overlap. As shown in the example in FIG. 1, devices 110 and 112 include logic or software applications 120 and 122, respectively. Base station 116 can include logic, indicated by reference numeral 124, that can be remotely accessed by base station 116 or other devices associated with the network 114. Logic can be divided among more than one location or device. For example, as shown in FIG. 1, logic 124 can be included with, or connected to, a base station subsystem 126 that can include a base station controller and/or a base transceiver station.

Figure 2:
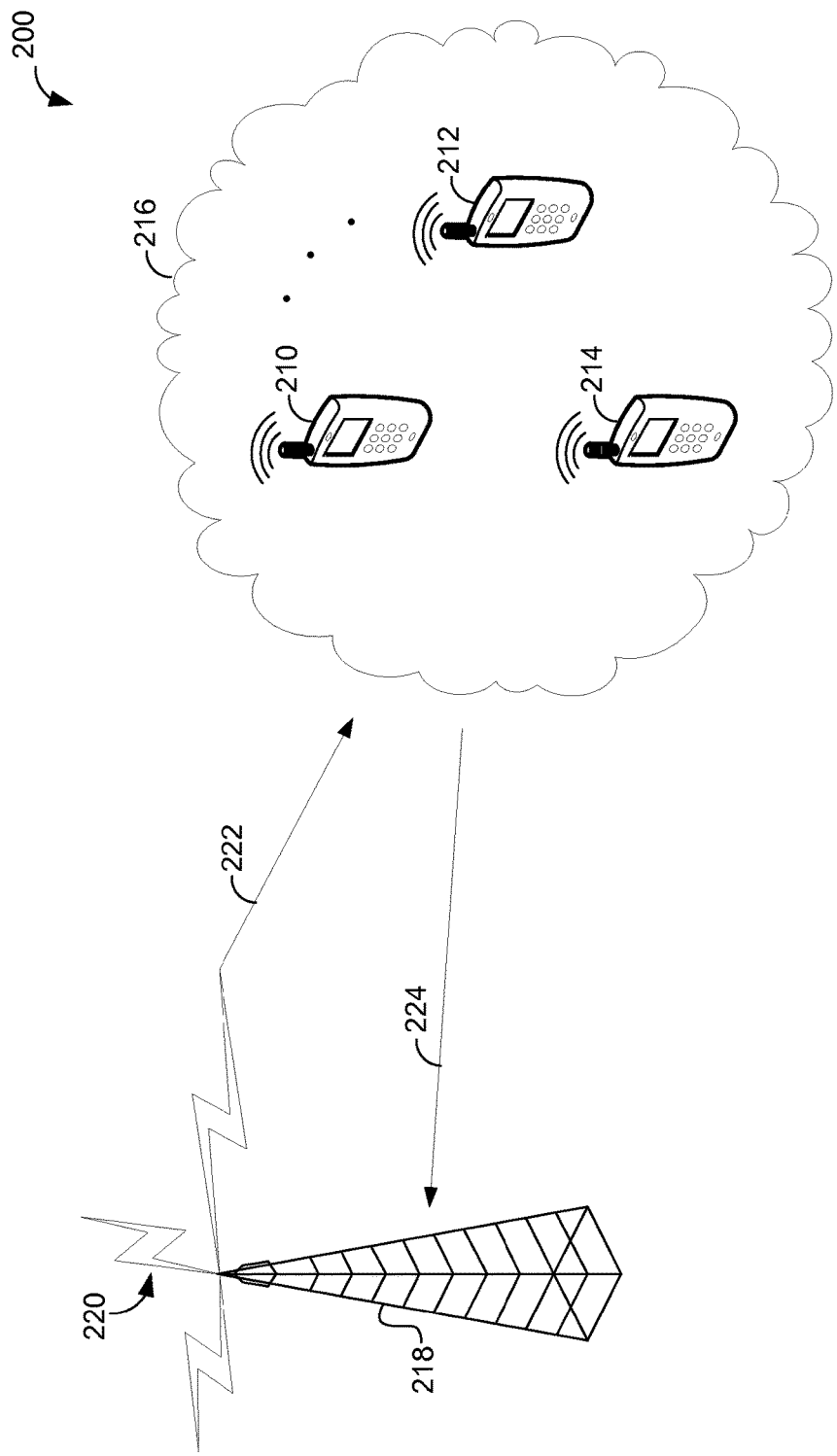
FIG. 2 is a flow diagram illustrating exemplary channels associated with a mobile telecommunications network.

FIG. 2 is a flow diagram illustrating exemplary channels associated with a mobile telecommunications network, shown generally as 200. Mobile devices 210, 212, and 214 are shown in a coverage area of network 216, where communications from base station 218 are capable of reaching the devices. A signal 220 is transmitted by base station 218. Signal 220 can include or provide a forward link, or downlink channel 222, from base station 218 to one or more mobile devices. Downlink channel 222 may be used to communicate with any or all of the mobile devices in coverage area 216, and downlink channel 222 may include a paging channel associated with the network.

FIG. 2 includes an exemplary reverse channel, or uplink channel 224, that can provide access to a network or one or more devices associated with the network, such as base station 218. Devices 210, 212, and 214 can communicate using uplink channel 224 in order to seek or request access, to place a call or content request, or to monitor for incoming calls or data. Coverage areas, such as area 216, can indicate where a mobile telecommunications network reaches, or where base station 218 is capable of broadcasting. A coverage area may not be static over time, and a mobile device may not be considered within a coverage area associated with a network, or recognized by the network, during entire methods embodying the present invention, as long a device associated with the network, such as base station 218, can broadcast communications to the device.

Figure 3:
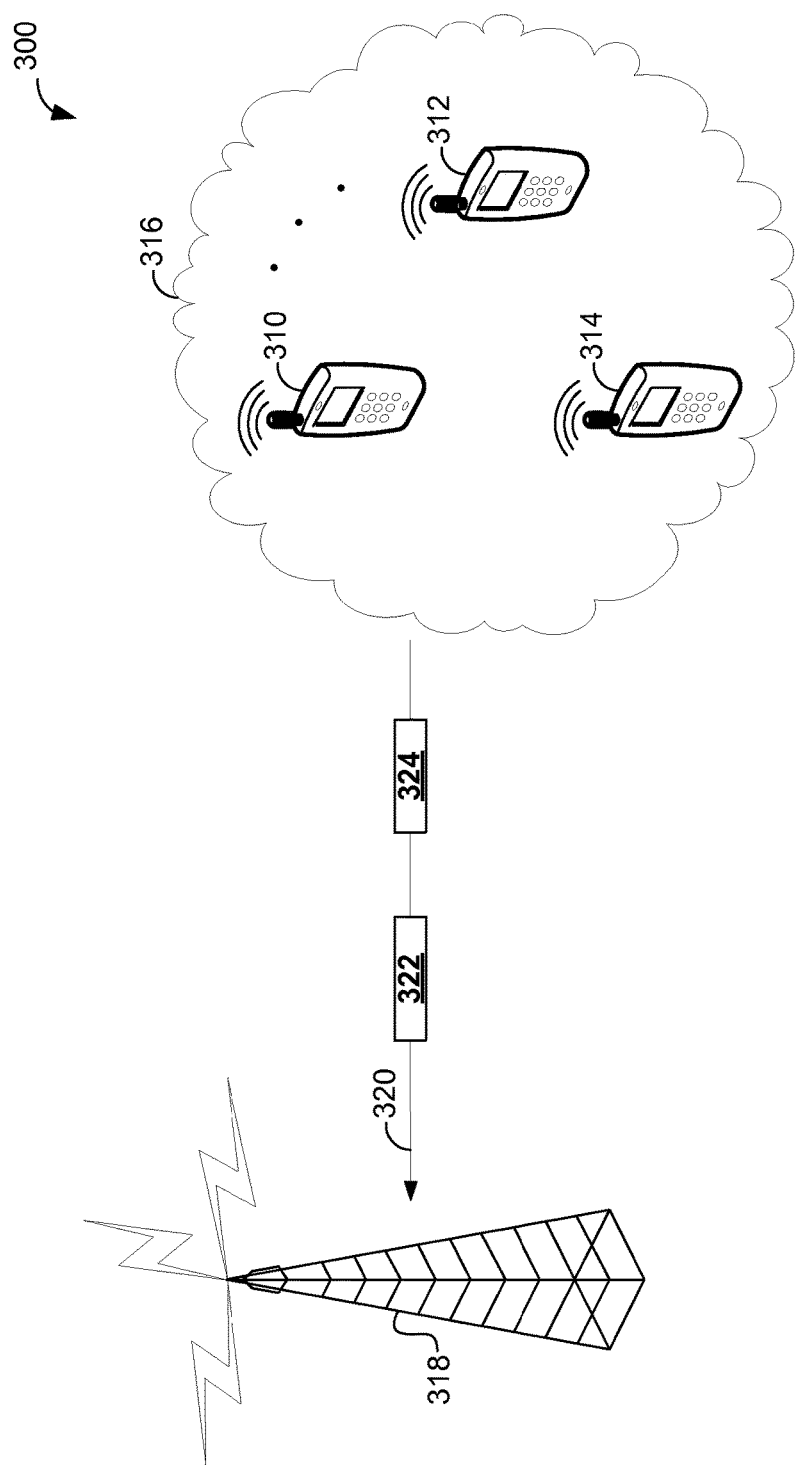
FIG. 3 is a flow diagram illustrating an exemplary communication associated with a mobile telecommunications network.

Turning to FIG. 3, a flow diagram illustrating an exemplary communication associated with a mobile telecommunications network, designated generally by reference numeral 300, is shown. Devices 310, 312, and 314 are within a coverage area of network 316, where the devices are capable of communicating with base station 318. A reverse channel, or uplink channel 320, can be used to communicate with a device associated with the network, such as base station 318. FIG. 3 shows two transmissions 322, 324 from one or more of the devices 310, 312, and 314.

In one example, transmission 322 represents a request for acknowledgement from device 310. The request 322 is communicated from device 310 to a device associated with network 316, such as base station 318, using uplink channel 320. Although a direct uplink 320 is shown in FIG. 3, one or more other devices associated with network 316 can receive and pass along transmissions to and from mobile devices. Additionally, although single transmissions 322 and 324 are shown, a request, response, or other message in accordance with embodiments of the present invention can include more than one transmission or discrete portions.

Continuing with the example above, transmission 324 represents a request for acknowledgement from device 312. Transmissions 322 and 324 can include requests for access, content, incoming calls, or other communications that trigger a confirmation or response. As shown in FIG. 3, transmissions 322 and 324, from devices 310 and 312, respectively, can use the same channel 320. In an embodiment of the present invention, mobile device 310 submits request 322, and mobile device 312 submits request 324. Devices 310 and 312 can be expecting acknowledgment of transmissions 322 and 324, such as response messages, simultaneously.

In an example, base station 318 has received more than one request (322, 324) from more than one device (310, 312) using an uplink channel 320. An amount of pending requests, such as the two requests 322, 324, can be used to determine how many devices will be acknowledged by an individual response. The total number of pending requests, the expected response time to one or more requests, or the overall network traffic can be used to optimize the acknowledgement of multiple devices. The status of additional devices, such as device 314, can be obtained and used to create or format a response that will be broadcast to the devices, as discussed below. Over time, the amount of devices that are intended to share one acknowledgement message can change. For example, the amount of devices that are addressed with one message can depend on whether or not device 314 or additional devices are also expecting acknowledgement.

Figure 4:
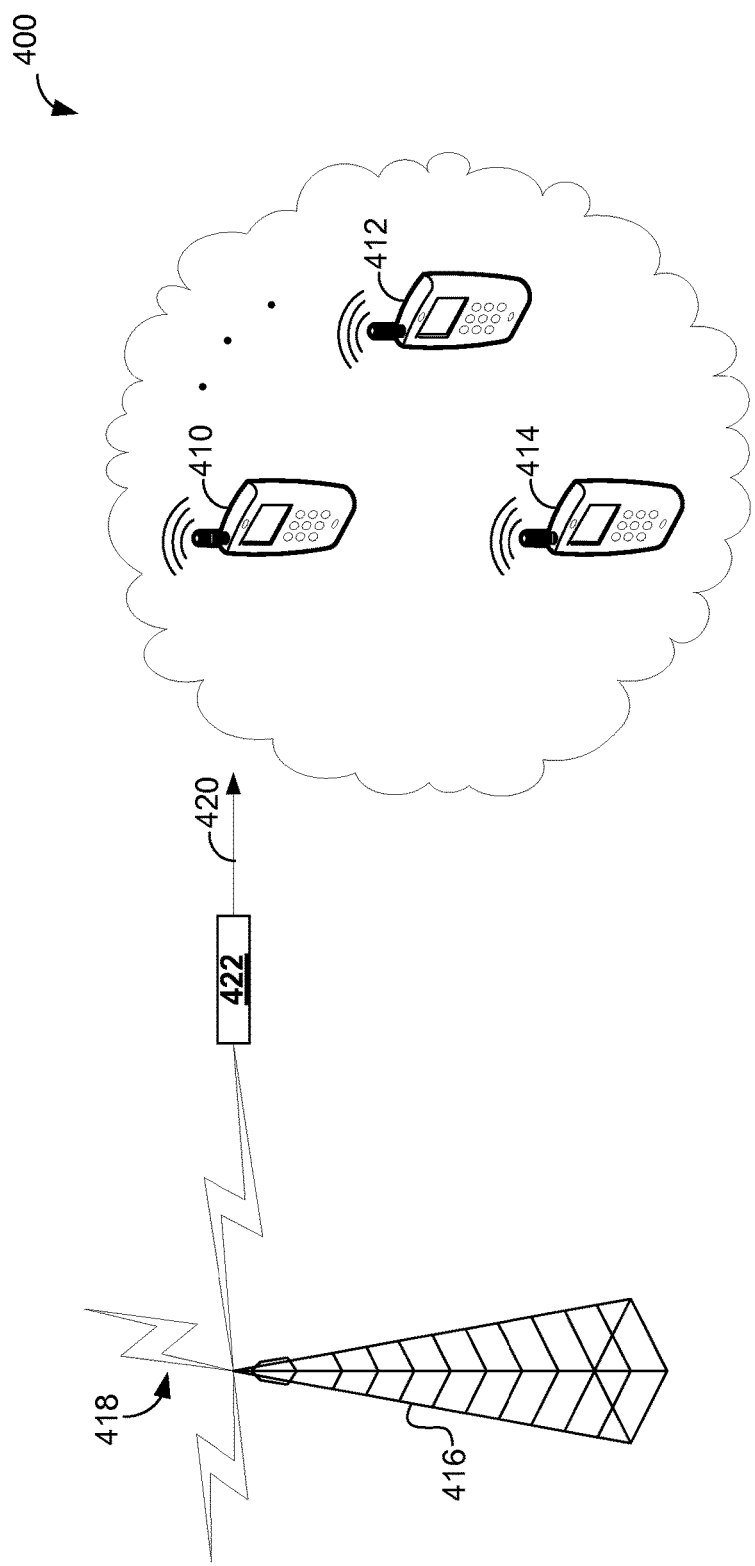
FIG. 4 is a flow diagram illustrating an exemplary communication associated with a mobile telecommunications network.

FIG. 4 is a flow diagram illustrating an exemplary communication associated with a mobile telecommunications network, designated generally as 400. In FIG. 4, devices 410, 412, and 414 can receive broadcasts from base station 416 using signal 418. Signal 418 can be an RF link that includes a downlink channel, such as downlink channel 420. As shown in FIG. 4, base station 416 can broadcast one transmission, such as transmission 422, to multiple mobile devices using downlink channel 420.

In embodiments of the present invention, mobile devices are associated with identifiers that include multiple characters. Examples of identifiers include international mobile subscriber identities (IMSI's), temporary mobile subscriber identities (TMSI's), portions of IMSI's or TMSI's (e.g., "short" IMSI's), or other identifiers consisting of a string of characters that are used to identify a mobile device associated with a network. For example, ten characters of a sixteen-digit identifier can be used as the identifier. Exemplary embodiments discussed herein include identifiers that are ten characters, or ten digits, in length. Identifiers can be sets or strings of more or less than ten characters. Twelve characters, or other amounts of characters that conform to a relevant identity-value field in a message to a mobile device, may be used. An identifier may be temporarily-assigned or encrypted for security purposes and still operate in accordance with embodiments of the present invention.

The characters or digits that make up identifiers can be alpha-numeric characters, symbols, images, or characters of any written or computing language. Identifiers can be represented or communicated as bits using a binary numeral language. In some cases, identifiers are the same type of character used by an indicator or flag component of a transmission, such as transmission 422, discussed below. In other cases, identifiers include a different type of character than an indicator or flag component. In one specific example, device 410 is associated with the identifier "6153301212." In this example, the last four digits of the identifier associated with device 410 are "1212" (and the last three digits are "212"). Device 412 is associated with a separate, unique identifier, such as "8264408787," meaning that the last four digits of the identifier for device 412 are "8787."

A device associated with a network, such as base station 416, can generate and/or broadcast transmission 422. In one example, devices 410 and 412 are awaiting acknowledgement, such as confirmation or a response to communications from the devices. In a embodiment, one acknowledgement message is created that includes groups of characters from two or more identifiers of mobile devices. Therefore, one transmission, such as transmission 422, is capable of acknowledging more than mobile device. This can reduce the amount of traffic one or more downlink channels (e.g., downlink channel 420).

In turn, mobile devices may receive acknowledgement sooner and send fewer requests. This can reduce traffic on an uplink channel associated with a network, such as uplink channel 320 shown in FIG. 3. In some cases, mobile devices may progressively increase the strength of requests while awaiting acknowledgement. Therefore, acknowledging devices sooner, or with increased efficiency, can reduce an escalation in traffic or power consumption associated with unanswered devices.

Using the exemplary identifiers discussed above, a single transmission 422 can be simultaneously broadcast to both device 410 and device 412. In an embodiment, transmission 422 includes an identity-value or field that contains the last three digits of the identifier for each device 410, 412. In this example, device 410 would detect or extract the digits "212" to identify an acknowledgment, and device 412 would use the characters "787" to determine that transmission 422 indicates acknowledgement of device 412. A single message or response, such as transmission 422, can satisfy more than one request from more than one mobile device. As discussed below, a third device, such as device 414, could also separate and recognize a subset of characters from a shared acknowledgement message, thereby using one broadcast to communicate acknowledgement to three mobile devices 410, 412, and 414.

Figure 5:
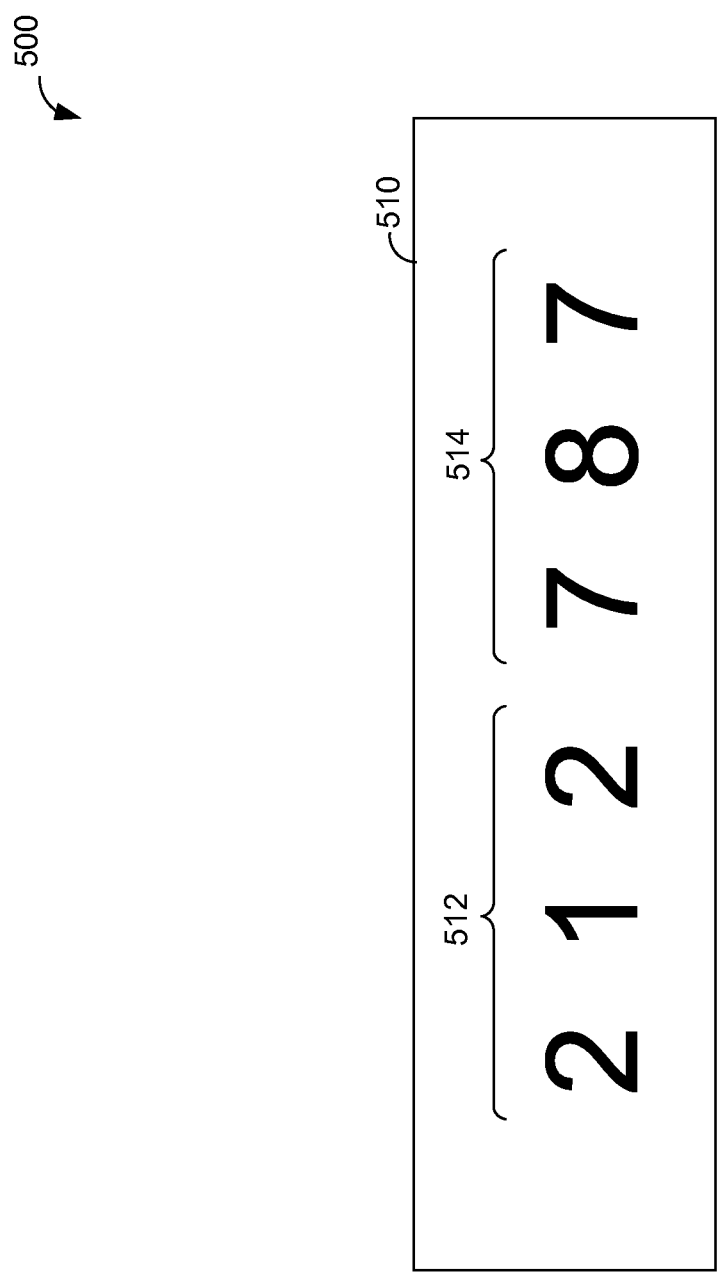
FIG. 5 is a diagram illustrating an exemplary value in accordance with an embodiment of the present invention.

FIG. 5 is a diagram illustrating an exemplary value in accordance with an embodiment of the present invention, indicated by reference numeral 500. The string of characters 510 is an example of a value used in a transmission, such as transmission 422 in FIG. 4, that multiple mobile devices can use to identify themselves. For example, device 410 in FIG. 4 is associated with the identifier "6153301212." Device 410 can use the subset of characters shown at 512, characters "212," to determine that an acknowledgement applies to device 410. In this example, device 412 in FIG. 4 is associated with the identifier "8264408787." Device 412 can receive the same string of characters 510 as received by device 410. Device 412 can extract and analyze the subset of characters shown at 512, but "212" would not be a match with the identifier associated with device 412. A second subset of characters, shown at 514 ("787"), can be recognized by device 412. In this case, "787" could be compared to the identifier for device 412, and a match would exist. More specifically, the second subset of characters 514 is the same as the last subset of characters of the identifier for device 412. Devices 410 and 412 can both use value 500 to recognize that an acknowledgment applies to devices 410 and 412.

In some embodiments of the present invention, mobile devices (e.g., devices 110, 112) are set to treat identifying values (e.g., value 500) as containing more than one subset of characters associated with more than one mobile device. For example, software or logic 120 and 122, on devices 110 and 112 in FIG. 1, respectively, can instruct devices to extract certain amounts of bits or characters from an identity-value in a potential acknowledgment message. A setting or code associated with device 110 can determine that a subset of characters within a transmission be compared to an identifier for device 110. Logic 120 can determine that three digits from a value are compared to the identifier, such as "212" (shown at 512 in FIG. 5). Alternatively, four, five, or more digits can recognized in a value and compared to a device-identifier.

The amount of digits in a subset of characters can be related to the amount of devices that can share an acknowledgment. In embodiments with a fixed length or space available for an identity value, fewer digits must be used to acknowledge more device with one broadcast. In these embodiments, acknowledging multiple devices at once can be balanced with a desire to use more digits associated with each device (to increase confidence in matches with identifiers). The length of subsets of characters can change over time to reflect this balance, for example as traffic increases. In some embodiments, although devices are coded to recognize shared values that contain portions of identifiers, the exact length of these portions is dynamic and/or indicated along with a transmission, such as transmission 422 in FIG. 4. In some cases, the exemplary values include null values, or reserved characters or bit locations, that may pad a value to an appropriate size.

Figure 6:
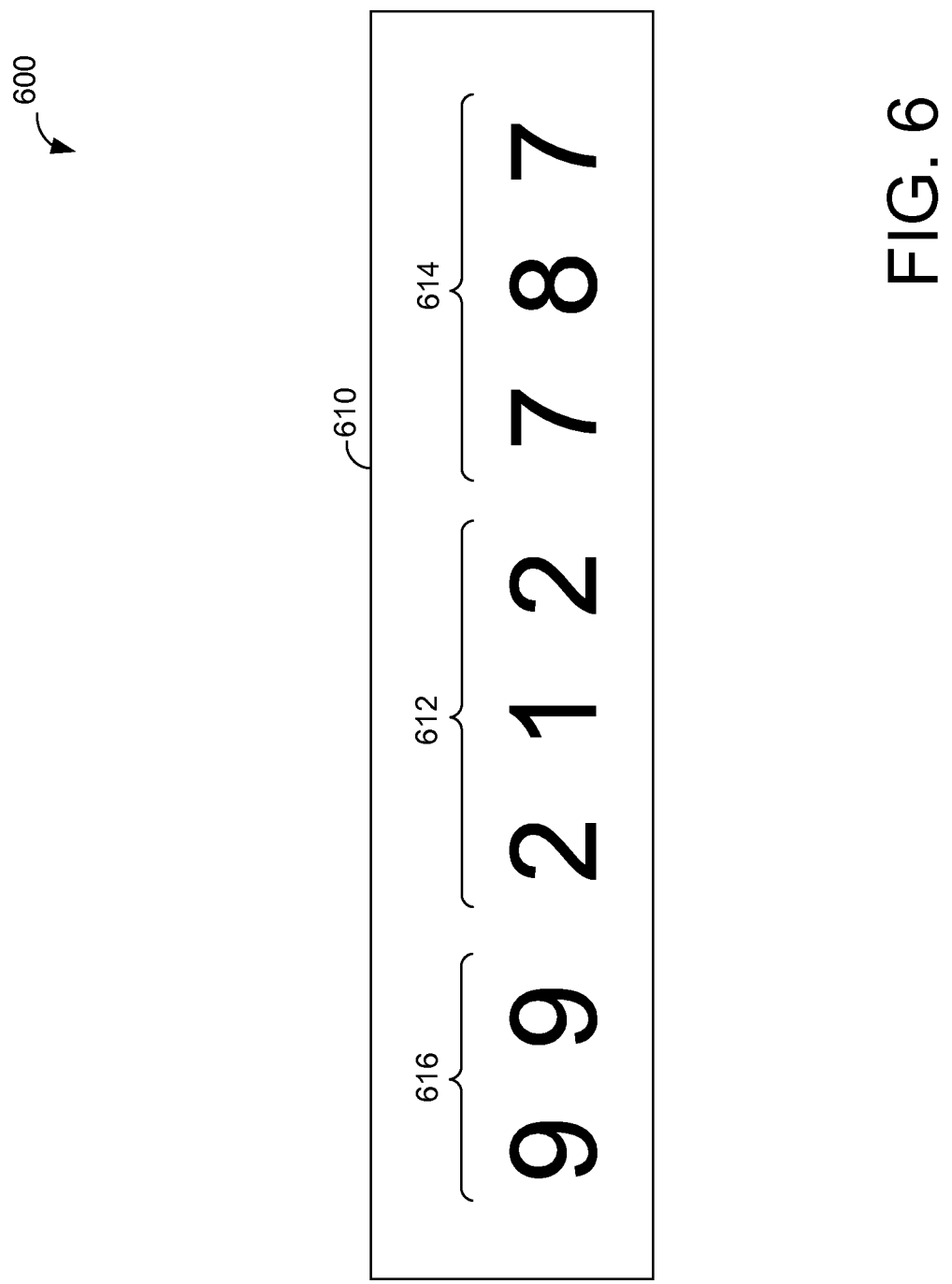
FIG. 6 is a diagram illustrating an exemplary value in accordance with an embodiment of the present invention.

FIG. 6 is a diagram illustrating an exemplary value in accordance with an embodiment of the present invention, shown generally as 600. FIG. 6 shows a character-string 610, including subsets 612 and 614, which correspond to the last three digits of the exemplary identifiers of devices 410 and 412 discussed above, respectively. Character-string 610 includes indicator 616. In an embodiment, indicator 616 is a two-digit indicator, but indicator 616 can be one-digit or more than two-digits in length. In some cases, where indicator 616 is a non-zero digit or value, then the remainder of character-string 610 is intended to be parsed into more than one subset of characters 612 and 614.

As shown in FIG. 6, indicator 616 is at the left end of character-string 610 and may be received by a device before the remainder of character-string 610. Alternatively, character-strings can be read from right to left, in which case an indicator can be located at the other end of character-string 610, in order to be received prior to the remainder of character-string 610. As discussed above, devices can be programmed or instructed to detect multiple subsets of characters in a value, in which case an indicator 616 can be used to communicate the size of the subsets of characters 612 and 614.

Figure 7:
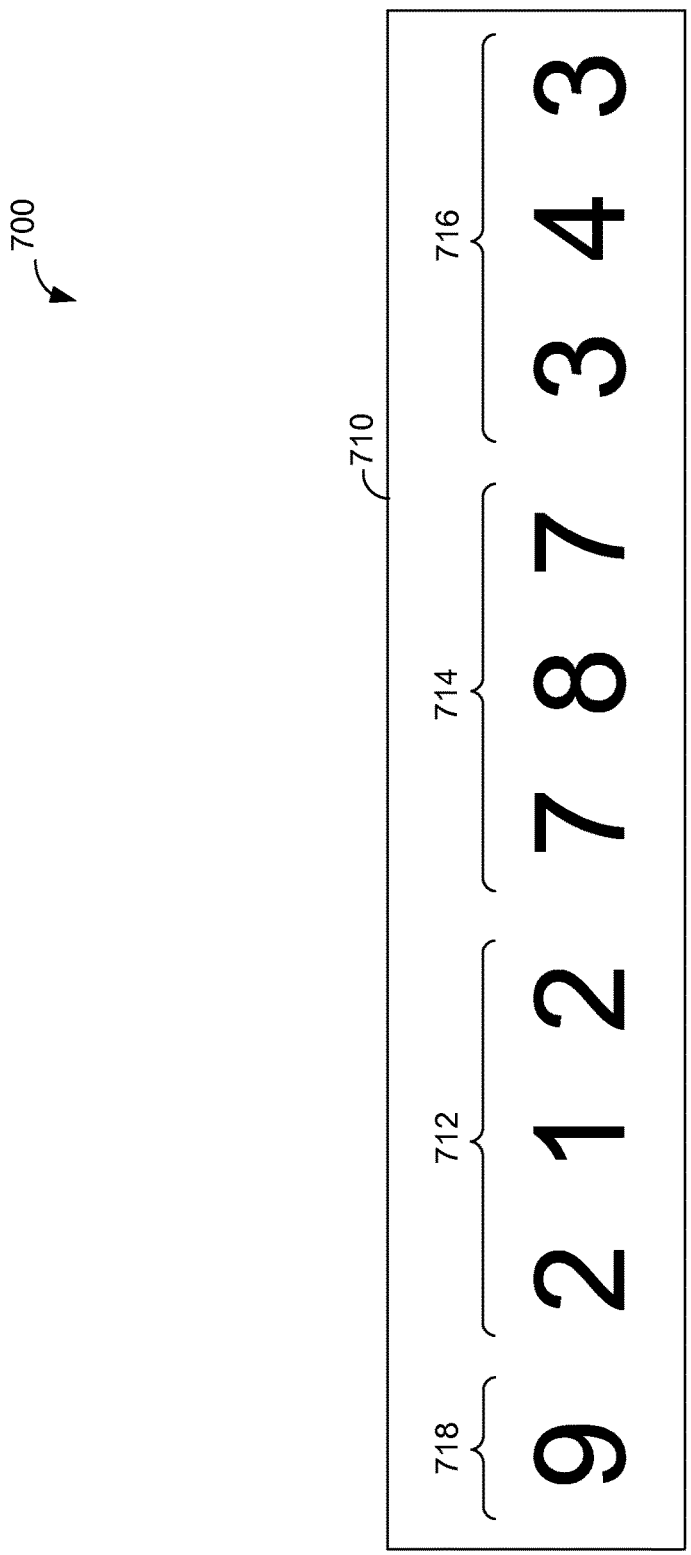
FIG. 7 is a diagram illustrating an exemplary value in accordance with an embodiment of the present invention.

FIG. 7 is a diagram illustrating an exemplary value, designated generally as 700, in accordance with an embodiment of the present invention. A string of characters, shown at 710, includes three unique character sets 712, 714, and 716. Continuing with the identifiers used in the examples above, one device is associated with a set of characters ending in "212" (set 712), and another device is associated with a set of characters ending in "787" (set 714). A third device could be associated with a set of characters ending in "343" (set 716).

Value 700 can be used to relay acknowledgement to three mobile devices with a single broadcast. This can prevent additional requests for acknowledgement from the third device, for example, that could occur if individual acknowledgements were being sent to the first and second devices. Indicator 718 in FIG. 7 can communicate that value 700 includes three unique sets of characters 712, 714, and 716. In some cases, indicator 718 can indicate the amount of digits in each of the sets of characters 712, 714, and 716. In one embodiment, a non-zero value at indicator 718 conveys that a shared identity-value follows, which includes discreet sets of characters associated with different mobile devices (e.g., devices 410, 412, and 414).

Figure 8:
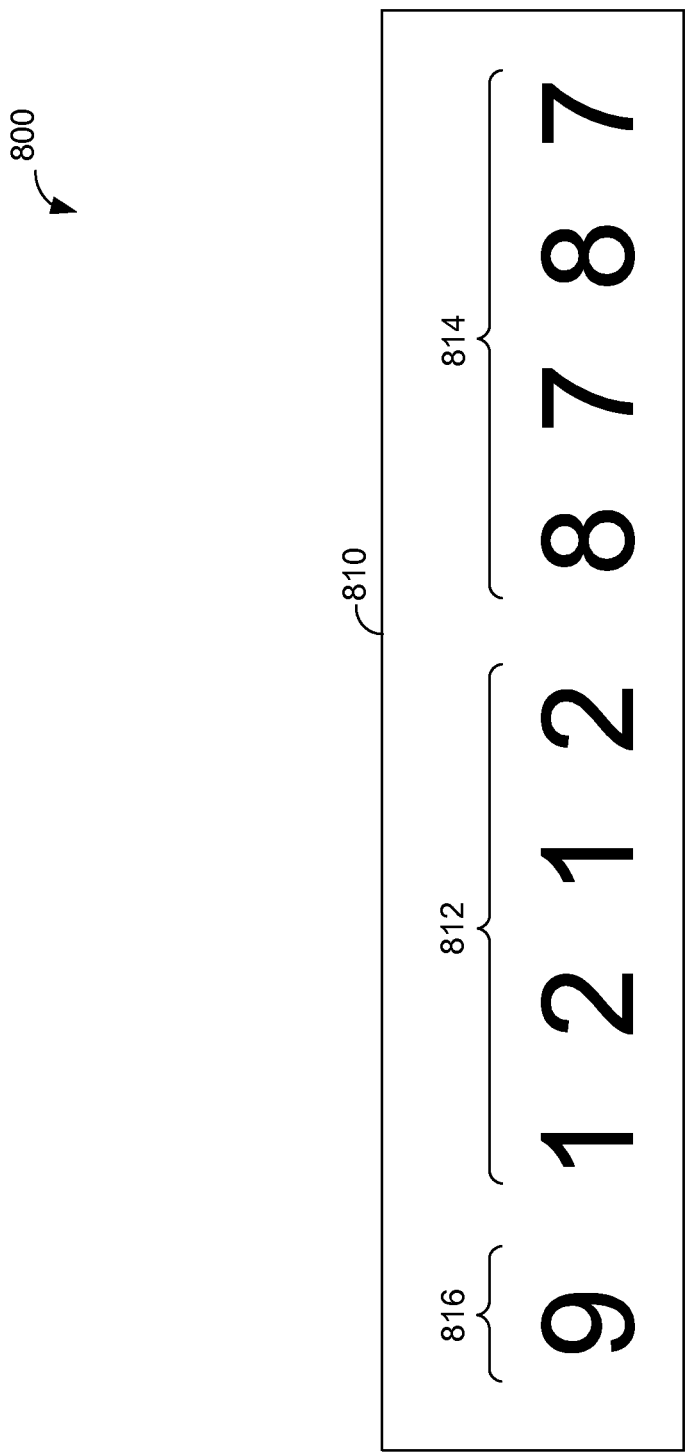
FIG. 8 is a diagram illustrating an exemplary value in accordance with an embodiment of the present invention.

FIG. 8 is a diagram illustrating an exemplary value, designated generally by reference numeral 800, in accordance with an embodiment of the present invention. FIG. 8 shows string 810 used in an acknowledgement message, such as transmission 422 in FIG. 4. String 810 includes to subsets of characters, 812 and 814, that are each four digits in length. FIG. 8 includes indicator 816, which can be a one-digit indicator 816 of how many mobile devices are being acknowledged, or how many bits from each devices' identifier are included in the acknowledgement. One or more locations within string 810 may not be in use. For example, one location in the string, such as a tenth digit not shown in FIG. 8, may be null, reserved, or ignored by devices. The string 810 in FIG. 8 may be used where the amount of demand on a network (either more or less devices requesting access or acknowledgement) is used to determine that four digits from each identifier, instead of more or less digits, should be used. In an embodiment, five digits from each identifier are used, with or without an indicator.

In a specific example, four digits are used instead of three digits from each identifier, in order to match more characters with each identifier and reduce errors (see FIG. 8). A change in circumstances could result in using three digits, instead of four, in order to acknowledge more devices with each broadcast (see FIG. 7). In some cases, when network traffic is higher or slower, more than two identifiers can be included in a value, such as value 700 in FIG. 7. As network traffic, response times, or demands change over time, a value with two identifiers can be used, such as value 810 in FIG. 8, permitting the matching of more digits. The amount of devices acknowledged with each broadcast can be optimized or adjusted based on relevant considerations.

Figure 9:
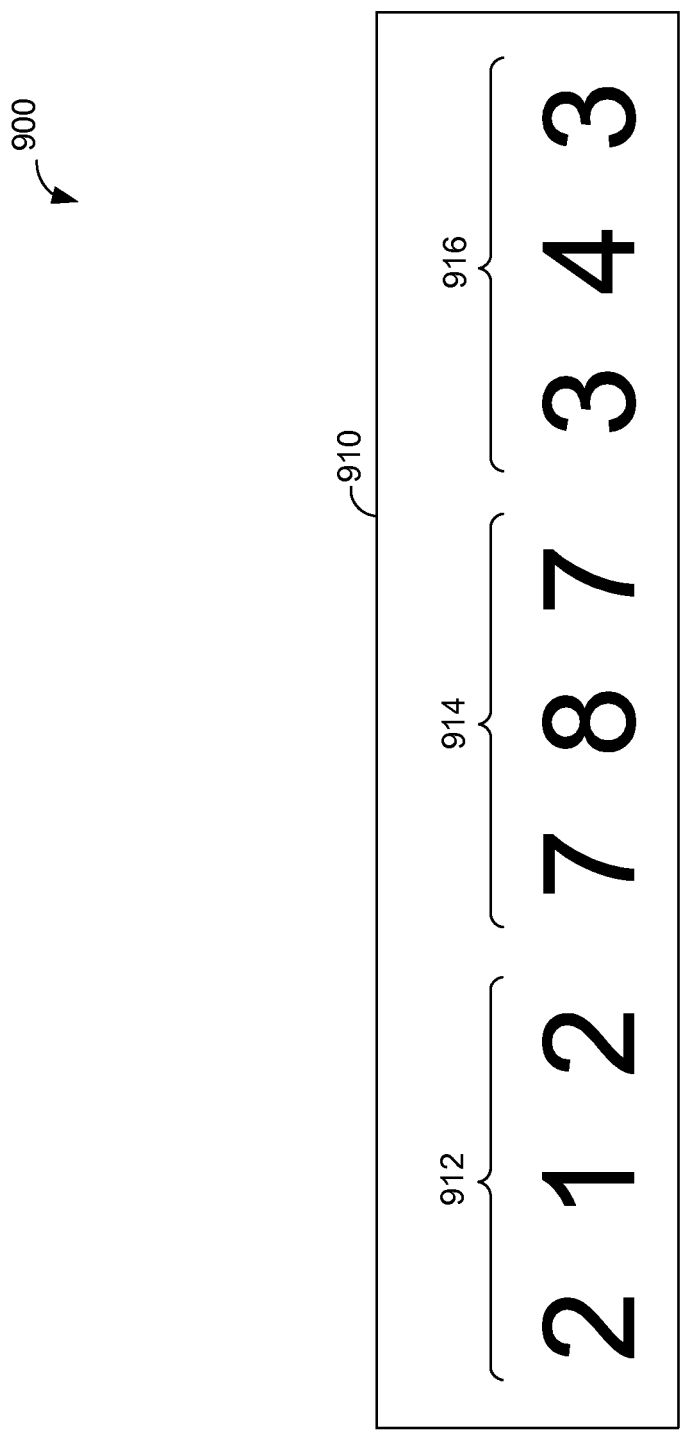
FIG. 9 is a diagram illustrating an exemplary value in accordance with an embodiment of the present invention.

Turning now to FIG. 9, a diagram shows an exemplary value, designated by reference numeral 900, in accordance with an embodiment of the present invention. The character-string 910 in FIG. 9 includes character-subsets 912, 914, and 916. Logic on a mobile device (e.g., logic 120 in FIG. 1) or associated with a base station (logic 124 in FIG. 1) can be set to recognize that character-string 910 includes multiple subsets of characters 912, 914, and 916. Each subset of characters 912, 914, and 916 correspond to three digits in three unique identifiers of mobile devices. In an embodiment, three devices receive acknowledgment through one broadcast or one character-string 910, including self-identification by the devices using one subset of characters 912, 914, or 916.

Figure 10:
FIG. 10 is a diagram illustrating an exemplary portion of a broadcast in accordance with an embodiment of the present invention.

FIG. 10 is a diagram illustrating an exemplary portion of a broadcast, designated generally be reference numeral 1000, in accordance with an embodiment of the present invention. The portion of a broadcast 1000 can include a message, such as message 1010, that contains an identity value 1012. In the example shown in FIG. 10, the identity value 1012 is ten digits long and associated with an IMSI label or field. In embodiments, mobile devices are coded to extract groups of characters from identity value 1012, such as "212," "787," and "343" (also shown as groups 712, 714, and 716 in FIG. 7). The first digit of value 1012 can be used to indicate that multiple groups of characters, matching portions of multiple identifiers, are included in value 1012. In one specific example, a first digit of value 1012 is the number "3," which indicates how many characters or bits of value 1012 should be used to identify a match with an identifier. An entire acknowledgment or message 1010 can be avoided with each additional mobile device that is addressed by a single acknowledgement message or broadcast.

In some embodiments of the present invention, as opposed to using an indicator in a value or field, alongside subsets of characters from device-identifiers, a separate flag 1014 can be used. Flag 1014 can indicate that an acknowledgement is intended for multiple mobile devices. A flag 1014 may be a separate value or description included in a message, such as message 1010. In some cases, flag 1014 is read or received first, and an identity-value can be parsed or analyzed based on flag 1014. Flag 1014 may indicate how many characters or bits make up each subset, or flag 1014 may indicate that multiple subsets are included without indicating the size of each subset.

As discussed above, logic or network setting can determine that all acknowledgements include portions of multiple, unique identifiers. Code can be used to instruct that the first digit, or the first two digits, of a value can indicate how many devices are addressed by one response, or how many bits to extract for comparison to an identifier. A flag, such as flag 1014, can also be used to indicate how many devices are targeted by one broadcast, or how many characters from each identifier are included in a response. Recognizing an acknowledgement can include any step after determining that a match exists, such as the match being communicated or stored by software on a device (e.g., logic 120), or the ceasing of access requests.

FIG. 11 is a flow diagram illustrating an exemplary method in accordance with embodiments of the present invention, designated generally by reference numeral 1100. At step 1110, it is determined that a first identifier identifies a first mobile device, and at step 1112, it is determined that the first identifier includes a first group of digits. As shown at step 1114, it is determined that a second identifier identifies a second mobile device, and, as shown at step 1116, it is determined that the second identifier includes a second group of digits. A string of digits is created that includes the first a second group of digits, as shown at step 1118. An exemplary string of digits 710 is shown in FIG. 7, including first and second groups of digits 712 and 714. At step 1120 of FIG. 11, the string of digits is broadcast to at least the first and second mobile devices. FIG. 4 illustrates an exemplary transmission 422 that can be broadcast to mobile devices, including devices 410 and 412.

Turning to FIG. 12, a flow diagram illustrating an exemplary method in accordance with embodiments of the present invention is shown and designated generally by numeral 1200. At step 1210, a first access probe is received from a first mobile device that is seeking access to a network. At step 1212, a second access probe is received from a second mobile device that is seeking access to the network. At 1214, it is determined that the first mobile device is associated with a first string of characters, and, at 1216, it is determined that the second mobile device is associated with a second string of characters.

As shown at step 1218, a first subset of characters is obtained from the first string of characters. For example, subset of characters 812 in FIG. 8 ("1212") can be obtained from a string of characters, such as "6153301212," that is associated with a mobile device. The subset of characters (e.g., subset 812) can be used by a mobile device to self-identify the mobile device. At step 1220 in FIG. 12, a second subset of characters, such as subset 814 in FIG. 8 ("8787"), is obtained from the second string of characters. At step 1222 in FIG. 12, an acknowledgement message is prepared that includes the first and second subsets of characters. The acknowledgement message is broadcast to the first and second mobile devices, such as devices 410 and 412 in FIG. 4, and the message can be used to satisfy the first and second access probes, as shown at step 1224 in FIG. 12.

FIG. 13 is a flow diagram illustrating an exemplary method in accordance with embodiments of the present invention, designated generally as 1300. As shown at step 1310, a request associated with a network is submitted from a mobile device. In an embodiment, transmission 322 in FIG. 3 is a request from device 310. Transmission 322 is received by a device associated with a network, such as base station 318. Returning to FIG. 13, at step 1312, it is determined that the mobile device is associated with a set of ten characters. In some embodiments, a set of ten characters is a portion of an identifier associated with a mobile device. At step 1314, a channel may be monitored for a response, such as downlink channel 420 in FIG. 4.

A response that includes an identity-value is received at step 1316. Exemplary identity-values are shown at 510 in FIGS. 5 and 710 in FIG. 7. At step 1318, it is determined that the identity-value includes two unique character-strings, such as strings 512 and 514 in FIG. 5. An indicator (e.g., indicator 718 in FIG. 7) can be used to determine that multiple character-strings are included in an identity-value. In some cases, logic (e.g., logic 120 in FIG. 1) can be used to indicate that multiple character-strings are included. A first character-string is extracted from the identity-value at step 1320, and the first character-string is compared to the set of ten characters associated with the mobile device at step 1322.

At step 1324, it is determined that the first character-string is included in the set of ten characters, such that the end-digits of each match. For example, string 512 in FIG. 5 matches the end of the identifier ""6153301212." At step 1326 of FIG. 13, it is recognized that the response satisfies the request. The length of character-strings, such as strings 512 and 514 in FIG. 5, can be dynamic over time or in response to network conditions, traffic, and/or demands. An indicator, such as indicator 718 in FIG. 7 or flag 1014 in FIG. 10, can be used to convey how many unique character-strings are included in an identity-value, or the size of character-strings to analyze. By broadcasting one value, where the value includes recognizable strings from multiple identifiers, paging traffic associated with a base station can be reduced. Traffic on another channel, such as an access channel, can also be reduced. For example, mobile devices that are acknowledged more efficiently will make less demands or requests, at lower power levels or strengths.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of reducing an amount of traffic used to acknowledge mobile devices associated with a wireless communications network, comprising:

submitting a first request that is associated with the network, wherein a mobile device submits said first request;

determining that the mobile device is associated with a set of at least ten characters;

receiving an acknowledgement of the request, wherein said acknowledgement includes an identity-value;

determining that said identity-value includes at least two unique character-strings, each unique character string corresponding to a respective mobile device, such that said acknowledgement is capable of satisfying more than one request submitted by more than one mobile device, including said first request;

extracting a first character-string from said identity-value, wherein said first character-string includes an end-character;

comparing said first character-string to said set of ten characters associated with the mobile device;

determining that said first character-string is included in said set of ten characters; and recognizing that said acknowledgement satisfies said first request, based on determining that said first character-string is included in said set of ten characters.

2. The method of claim 1, further comprising determining that said identity-value includes a one-digit indicator that indicates a number of characters in said first character-string.

3. The method of claim 1, wherein an amount of unique character-strings included in said identity-value is dynamic.

4. The method of claim 1, wherein a flag in said acknowledgement indicates that said identity-value includes at least two unique character-strings.

5. The method of claim 1, further comprising monitoring a paging channel that is associated with the network, wherein the mobile device monitors the paging channel for said response.

6. Non-transitory computer-readable media having computer-executable instructions embodied thereon that, when executed, perform a method of reducing an amount of traffic used to acknowledge mobile devices associated with a wireless communications network, the method comprising:

submitting a first request that is associated with the network, wherein a mobile device submits said first request;

determining that the mobile device is associated with a set of at least ten characters;

receiving an acknowledgement of the request, wherein said acknowledgement includes an identity-value;

determining that said identity-value includes at least two unique character-strings, each unique character string corresponding to a respective mobile device, such that said acknowledgement is capable of satisfying more than one request submitted by more than one mobile device, including said first request;

extracting a first character-string from said identity-value, wherein said first character-string includes an end-character;

comparing said first character-string to said set of ten characters associated with the mobile device;

determining that said first character-string is included in said set of ten characters; and recognizing that said acknowledgement satisfies said first request, based on determining that said first character-string is included in said set of ten characters.

7. The media of claim 6, further comprising determining that said identity-value includes a one-digit indicator that indicates a number of characters in said first character-string.

8. The media of claim 6, wherein an amount of unique character-strings included in said identity-value is dynamic.

9. The media of claim 6, wherein a flag in said acknowledgement indicates that said identity-value includes at least two unique character-strings.

10. The media of claim 6, further comprising monitoring a paging channel that is associated with the network, wherein the mobile device monitors the paging channel for said response.

11. A system for reducing an amount of traffic used to acknowledge mobile devices associated with a wireless communications network, comprising:

a base station;

a mobile device configured to:
A) submit a first request that is associated with the network to the base station,
B) determine that the mobile device is associated with a set of at least ten characters;
C) receive an acknowledgement of the request from the base station, wherein said acknowledgement includes an identity-value;
D) determine that said identity-value includes at least two unique character-strings, each unique character string corresponding to a respective mobile device, such that said acknowledgement is capable of satisfying more than one request submitted by more than one mobile device, including said first request;
E) extract a first character-string from said identity-value, wherein said first character-string includes an end-character;
F) compare said first character-string to said set of ten characters associated with the mobile device;
G) determine that said first character-string is included in said set of ten characters; and
H) recognize that said acknowledgement satisfies said first request, based on determining that said first character-string is included in said set of ten characters.

12. The system of claim 11, wherein the mobile device is further configured to determine that said identity-value includes a one-digit indicator that indicates a number of characters in said first character-string.

13. The system of claim 11, wherein an amount of unique character-strings included in said identity-value is dynamic.

14. The system of claim 11, wherein a flag in said acknowledgement indicates that said identity-value includes at least two unique character-strings.

15. The system of claim 11, wherein the mobile device is further configured to monitor a paging channel that is associated with the network for said response.

* * * * *